United States Patent [19]

Brola

[11] 4,089,325
[45] May 16, 1978

[54] SOLAR HEATED BOILER

[75] Inventor: Gabriel Brola, Nogent-sur-Marne, France

[73] Assignee: Entreprise Industrielle de Chaudronnerie, France

[21] Appl. No.: 704,698

[22] Filed: Jul. 12, 1976

[30] Foreign Application Priority Data

Jul. 18, 1975 France .................. 75 22510

[51] Int. Cl.² .................................. F24J 3/02
[52] U.S. Cl. ........................ 126/271; 60/641
[58] Field of Search ............ 126/270, 271; 237/1 A; 60/641; 165/106

[56] References Cited

U.S. PATENT DOCUMENTS

| 842,658 | 1/1907 | Haskell | 126/271 |
|---|---|---|---|
| 1,425,174 | 8/1922 | Cartter et al. | 126/271 |
| 1,951,403 | 3/1934 | Goddard | 126/271 |
| 3,208,447 | 9/1965 | Laszlo | 126/270 |
| 3,985,116 | 10/1976 | Kapany | 126/271 |
| 3,996,917 | 12/1976 | Trihey | 126/271 |
| 4,003,367 | 1/1977 | Wikholm | 126/271 |

Primary Examiner—Kenneth W. Sprague
Assistant Examiner—James C. Yeung
Attorney, Agent, or Firm—Stevens, Davis, Miller & Mosher

[57] ABSTRACT

The invention has for its object a solar boiler comprising a surface exposed to radiations, having a plurality of cavities or cells acting as black bodies. Each of the cavities is formed by a blind tube protruding in a space in which a heat conveying fluid is allowed to circulate. The invention may be applied e.g. for producing hot water or steam.

3 Claims, 7 Drawing Figures

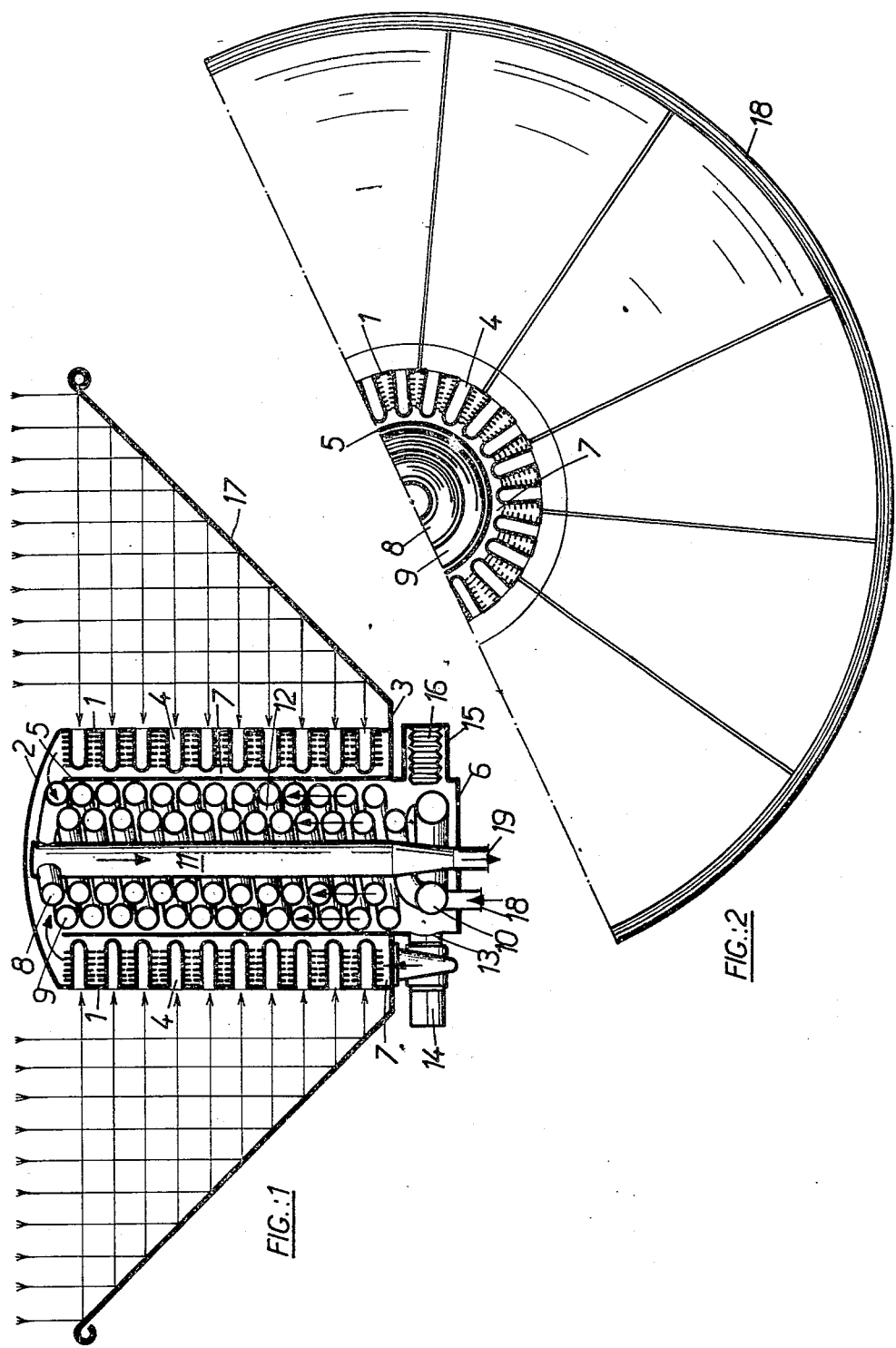

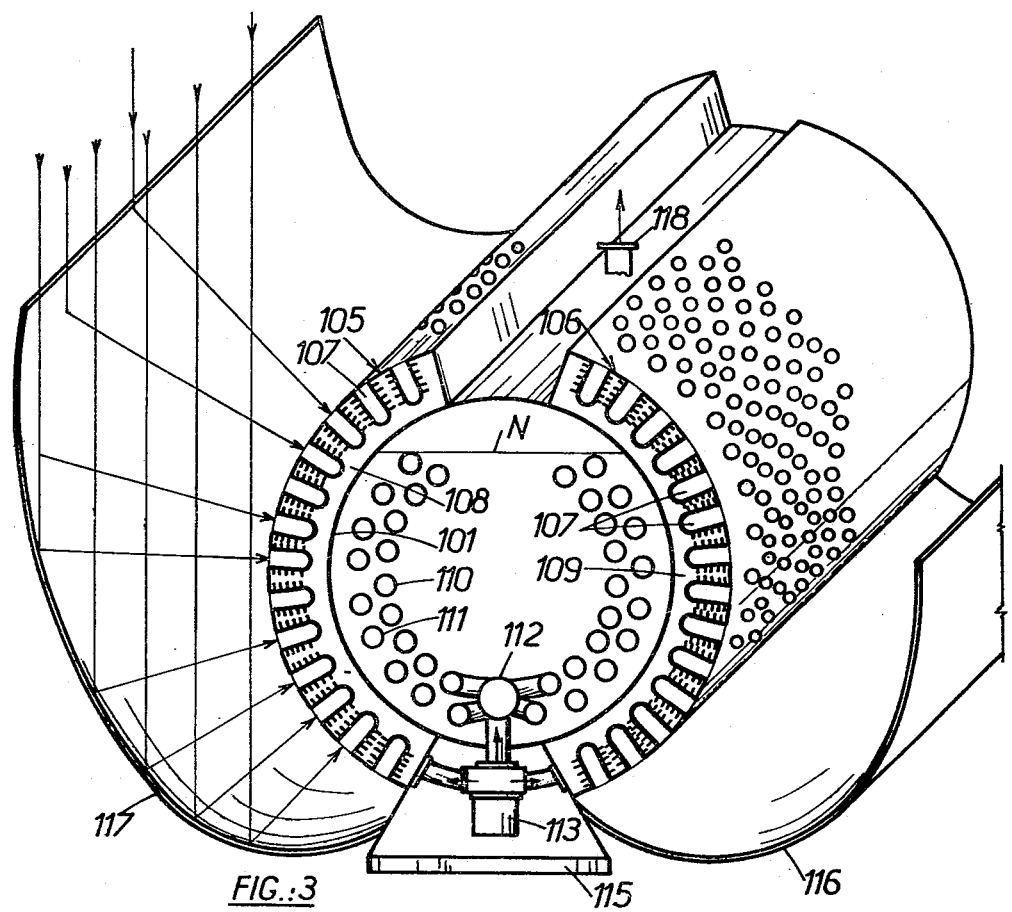
FIG.:3
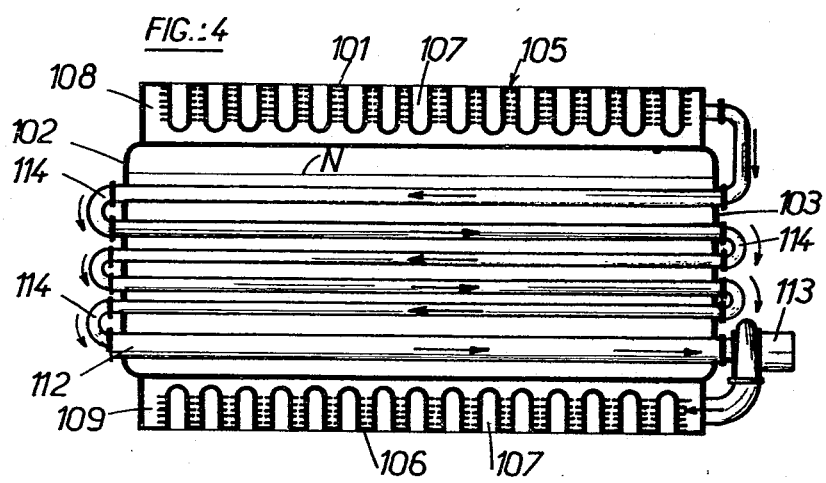
FIG.:4

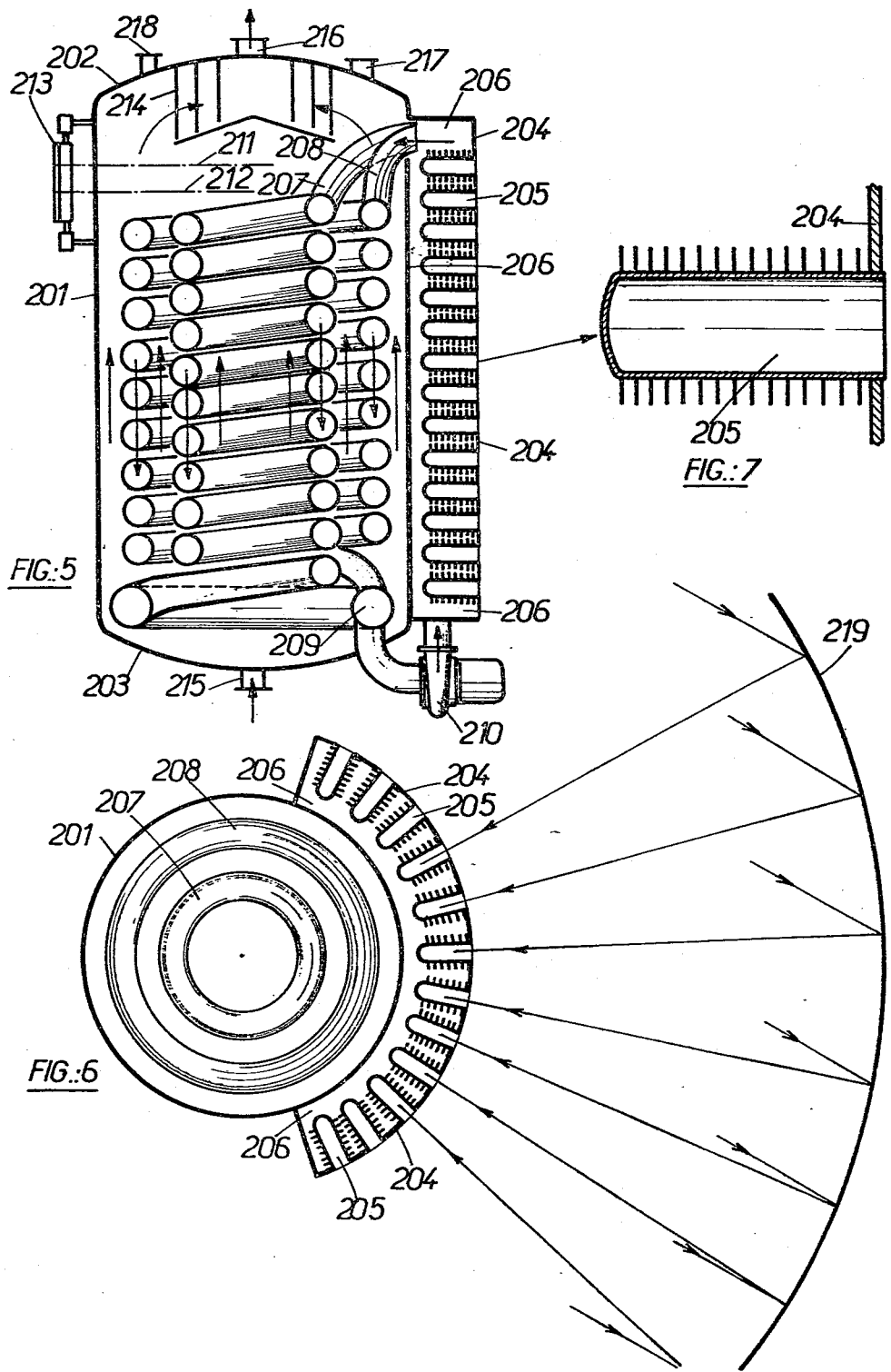

SOLAR HEATED BOILER

The present invention relates to boilers capable of using as heat energy the solar radiation, and has more particularly fort its object to provide a boiler of this kind which is specially simple and efficient.

The operating principle of such a boiler is based upon the physical law of the emission and absorption properties of the solar radiation by a cavity acting as black body. A blind cavity may be regarded as a black body if the depth is great enough with respect to its transverse size. Consequently, in order to obtain a maximum absorption of the solar radiation, for every wavelength of this radiation, according to the invention, the surface of the boiler, which is exposed to solar radiation comprises a plurality of cavities or cells forming black bodies, these cavities being suitably formed by blind cylinder tubes, made of a good heat conveying material, the depth of which is at least two and half its diameter.

Various objects, features and attendant advantages of the present invention will be more fully appreciated as the same becomes better understood from the following detailed description of the present invention when considered in connection with the accompanying drawings, in which:

FIG. 1 is an axial section view of a first embodiment of the invention;

FIG. 2 is a corresponding half plan view with part in section;

FIG. 3 is a perspective view of an other embodiment;

FIG. 4 is an axial section view corresponding to FIG. 3;

FIG. 5 is an axial section view of an other embodiment;

FIG. 6 is a cross-sectional view corresponding to FIG. 5; and

FIG. 7 is a detailed section view of a cell used as a black body.

In the embodiment shown on FIGS. 1 and 2, the boiler comprises a sleeve 1, closed at the upper end part by a curved head 2, and at the lower end by an annular plate or ring 3. Extending on the whole outer wall of this sleeve, are provided a plurality of cylinder cells 4, the length of which is at least two and half greater than the internal diameter. These cells are formed from portions of an externally ribbed tube of small diameter, the internal end of which is closed, and the outer end is welded to the edge of apertures provided in the wall of sleeve 1. These cells form the cavities of black bodies which absorb solar radiations and produce heat from it.

Inside of sleeve 1, a second sleeve 5 is disposed with its upper end open and with its lower end closed by a plane plate 6, projecting radially outwardly under the ring 3. Between sleeve 1 and sleeve 5 there is an annular space 7 in which are disposed the externally ribbed tubes 4 acting as black body cells.

In sleeve 5 there are provided two coaxial coils 8 and 9, made of small diameter pipes. These coils are connected by their lower ends to a common collector 10 and by their upper ends to a central tube 11.

Coils 8 and 9 are housed in an annular space 12 provided between inner wall of sleeve 5 and central tube 11. This annular space communicates with other annular space 7 by means of an opening 13 on which is mounted the intake of a circulating pump 14, the delivery of which is connected to annular space 7.

In the annular spaces 7 and 12 circulates a heat conveying fluid, and this circulation is forced by a pump 14. At the bottom of sleeve 5 is fixed a pipe 15 in which a metallic bellows is disposed. The variations in volume of this bellows allow to take in the dilatation of the heat conveying fluid.

In the coils 8 and 9, as well as in the central tube 11, circulates a second fluid provided for evacuating the thermal energy in the form of a hot or superheated fluid, or even in the form of a vapor.

On the ring 3 there is mounted a frusto conical reflector 17, made of several sectors 18 (FIG. 2). The inner wall of this reflector is made bright so as to reflect the solar radiations towards the center, i.e. in the direction of the black body cells disposed on the wall of cylinder sleeve 1.

The boiler operates in the following way:

The solar radiations are taken by the reflector 17 and reflected towards cylinder sleeve 1 where the black body cells are disposed. The radiation penetrates in the space of the cells where it is trapped, because after repeted reflections, it is dissipated into heat. This heat warms the inside wall of the tubes constituting the cells, and through conductivity, heat is transfered outside to the ribs which are lying in the heat conveying fluid. Through forced convection, the heat is taken by the liquid and transferred to the tubes of both coils 8 and 9. This heat is transferred by convection to the second fluid circulating in these coils. The cold liquid enters through piping 18 in the collector 10 which is connected to these two coils. The superheated or vaporized liquid leaves finally the boiler through piping 19.

This type of solar boiler can be used for relatively law thermal power, for example, for a heating or air conditionning installation, or even for producing steam necessary for feeding low power motors.

In the case of heavy thermal power, an other embodiment of solar boiler can be used, the principle of operation of which is identical, but is different in the construction technology.

Such an embodiment is shown on FIGS. 3 and 4. It comprises an horizontal cylinder tank constituted by a sleeve 101 (FIG. 3) closed by two bulging sides 102 and 103 (FIG. 4). The diameter and length of the sleeve are choosen according to the power of the boiler.

Outside of the sleeve and with the same axis, two sleeve sectors 105 and 106 are welded, and in which are mounted many cells 107 formed by blind tubes of small diameter fitted with ribs. The inner closed space of these tubes constitute the black bodies.

Between the sleeve of the boiler's body and the sectors 105, 106 are provided two annular spaces 108 and 109 in which the black body cells are projecting.

Inside the boiler's body, there is mounted two rows of horizontal tubes 110 and 111, the ends of which pass through two curved plates 102 and 103. In the lower part is placed a collector 112 which connects the two tubular rows, and outside of this collector is mounted a circulating pump 113 (FIG. 4). The discharge of the pump is connected to both spaces 108 and 109 where the black body cells are housed. The tubes of rows 110 and 111 are series connected by means of return bends 114 and the upper part of these tubes is connected to both annular spaces 108 and 109 (FIG. 4).

Inside the two rows and two spaces 108 and 109, circulates the heat conveying fluid by means of pump 113.

The boiler's body is filled up with secondary fluid up to level N. On the frame 115 are mounted two reflectors 116 and 117 of cylindro parabolic form, the inner surface of which is made bright so as to reflect the solar radiation received on the cells of the black bodies.

The above described solar boiler operates in the following way:

The solar radiation is reflected by the two reflectors 116 and 117 towards cells 107 where it is trapped and transformed into heat.

Through conductivity, the heat is transferred to the ribs of the tubes of these cells, then, through forced convection of the heat conveying fluid which circulates around these cells, heat is transferred to tubular rows 110 and 111. Afterwards, through convection, this heat is transferred finally to the second fluid which is inside the body of the boiler.

This fluid vaporizes and the steam going out in piping 118 (FIG. 3) can be used for moving a turbo-alternator.

The advantage of this system of solar boiler is the possibility of using cylindro-parabolic reflectors allowing a high degree of radiation concentration of about 20 to 30 to be obtained. With this radiation concentration, it is possible to produce steam at a temperature of 300 to 400° C, and so to realize a complex cycle, the efficiency of which may reach about 35 to 40% if special thermodynamic fluids are used.

When it is necessary to get a higher thermal power production, from solar radiation, it is possible according to the invention, to use a further different embodiment of a solar boiler, of which the radiation concentration system is mounted independantly of the boiler. The reflector is placed at a greater distance, and covering a greater surface, so as to have a more important concentration factor, and consequently a higher energy density per surface unit. Such a boiler can be used principally for producing high pressure steam in view of feeding a high power turboalternator.

The boiler comprises a cylindrical sleeve 201 (FIG. 5) vertically disposed and closed at both ends by two curved bottoms 202 and 203. Along the periphery of this sleeve, there is placed, at a distance and only on a sector, a second sleeve 204 (FIG. 6). On the wall of this sleeve, there are a multiplicity of cells 205 acting as black bodies.

Between this sleeve 204 and sleeve 201, there is provided an annular space 206 in which are housed the rib fitted tubes 205 of the black body cells. This space is connected at its upper part to two piping coils 207 and 208, and at its lower part to a collecter 209 and a circulating pump 210.

The two coils 207 and 208 are placed inside the sleeve 201. Inside the tubes of these coils, and inside the annular space 206, a heat conveying fluid circulates under the action of pump 210.

The boiler is filled up with a second fluid up to a level between lines 211 and 212, and as can be observed on gauge 113.

In the upper part, there is a vapor separating device 214.

The feeding of the boiler with secondary fluid is made in the lower part through piping 215, and the steam is going out through piping 216. Control devices and safety valves are placed on piping 217 and 218.

Outside, at a distance, is placed the reflector 219 which reflects back the solar radiation to the boiler.

The just described solar boiler operates in the following way:

Reflector 219 concentrates solar radiation upon active surface 204 of the boiler, where the black body cells are placed. The cells generate heat which is transmitted through forced convection to the heat conveying fluid, which circulates between the cells and also in the two coils 207 and 208 placed in the body of the boiler. The fluid circulation is accelerated by pump 210.

Through forced convection, the coils transfer this received heat to secondary fluid which is placed in the body of the boiler. This fluid vaporizes, and through separator 214 and piping 216, that steam is lead to utilization, i.e. towards a turboalternator.

This boiler system brings the advantage of allowing the use of independant reflectors, permitting very high radiation concentrations and so obtain a greater steam output to a higher temperature. With this solar boiler, it is possible to build actually helio-electric generation station of high power with high efficiency, if complex cycles are applied, with special thermal fluid of low vapour pressure.

Although only preferred embodiments are specifically illustrated and described herein, it will be appreciated that many modifications and variations of the present invention are possible in light of the above teachings and within the purview of the appended claims without departing from the spirit and intended scope of the invention.

I claim:

1. A solar boiler comprising in combination:
   a curved surface provided with a plurality of adjacent cavities formed each with a blind tube, the length of which is at least two and half times its diameter, said tubes being normal to the said surface and located on the concave side of it;
   a reflector adapted to reflect solar rays towards said surface, and into said cavities;
   a wall substantially parallel to said surface enclosing a region and defining with said surface a space in which said tubes extend;
   means for subdividing said region into two adjacent parts one of which communicates with said space and the other of which is separated from it, means for circulating a first heat conveying fluid through the said space and said one part of said region, and means for circulating a second fluid through said other part whereby said second fluid can be heated by heat exchange with said first fluid.

2. A solar boiler as claimed in claim 1 wherein said tubes are fitted each with a series of ribs on their surfaces located in said space, whereby their heat transfer is increased.

3. A solar boiler comprising in combination a hollow cylinder, a second hollow cylinder defining with said first cylinder, an annular space, means defining a plurality of closely spaced blind tubes mounted on said first cylinder and extending radially into said annular space, a reflector adapted to reflect solar rays towards said surface and into said tubes, heat exchange means subdividing the interior of said second cylinder into two regions, one in communication with said annular region and one isolated from it.

* * * * *